United States Patent [19]
Presto et al.

[11] 3,937,898
[45] Feb. 10, 1976

[54] DIGITAL CONFERENCE BRIDGE

[75] Inventors: Anthony Frank Presto, Nutley; James Grant Dunn, Upper Montclair; Thomas Chungmin Chen, West Caldwell, all of N.J.

[73] Assignee: International Telephone and Telegraph Corporation, Nutley, N.J.

[22] Filed: July 18, 1974

[21] Appl. No.: 489,574

[52] U.S. Cl. ............................. 179/18 BC; 179/15 A
[51] Int. Cl.² ...................... H04M 3/56; H04Q 11/04
[58] Field of Search ................................. 179/18 BC

[56] References Cited
UNITED STATES PATENTS

| | | | |
|---|---|---|---|
| 3,551,600 | 12/1970 | Berch | 179/18 BC |
| 3,604,855 | 9/1971 | Pommerening | 179/18 BC |
| 3,761,624 | 9/1973 | Lewis | 179/18 BC X |

*Primary Examiner*—William C. Cooper
*Attorney, Agent, or Firm*—John T. O'Halloran; Menotti J. Lombardi, Jr.; Alfred C. Hill

[57] ABSTRACT

There is disclosed a digital conference bridge for a delta modulated switching system having information transmitted by delta modulation bits in M channels of a time division multiplex frame, where M is an integer greater than three. N conferees, where N is an integer greater than two but less than M, are interconnected by a time switch to enable a conference to take place among the conferees. N three stage shift registers are provided, one for the delta modulation bits of each of the conferees. N sequence detectors are coupled to an associated one of the shift registers to produce a binary 1 output when bits stored in the shift register are all binary 1 or all binary 0. N counters each have their count increased by the binary 1 output of an associated one of the sequence detectors. A count comparator is coupled in common to all the counters and produces a control signal indicating a new speaker for the counter having the largest count. A selection matrix is coupled to each shift register and responds to the control signal to couple the delta modulation data of the new speaker through a one stage memory to the time switch for distribution to all of the conferees.

9 Claims, 4 Drawing Figures

DIGITAL CONFERENCE BRIDGE

BACKGROUND OF THE INVENTION

This invention relates to a conference bridge and more particularly to a conference bridge for automatic switching systems.

There are two known types of conference bridges now in use. The first type is an analog conference bridge employing a mixed analog and digital switch. However, this type of conference bridge introduces severe peaks of traffic across the intermatrix units which conferences with several digital subscribers would cause. The second type is a conference bridge based on a digital-to-analog conversion followed by analog mixing and analog-to-digital conversion. In this type of conference bridge, there is employed an encoder/decoder for each conference channel occupying one integrated circuit card. Therefore, if it is required to enable ten conferees in a conference, 10 cards would be required for the encoders/decoders alone. Further, if mixing type conference bridges are connected in tandem to assemble large conference degradation of speech quality would occur because of accumulative quantizing errors.

A copending application of C. R. Brown, Ser. No. 407,686, filed Oct. 18, 1973, assigned to the same assignee as the present application, discloses one form of digital conference bridge overcoming the above-mentioned disadvantages.

SUMMARY OF THE INVENTION

An object of this invention is to provide a second type of digital conference bridge overcoming the above-mentioned disadvantages.

Another object of this invention is to provide a digital conference bridge capable of providing a conference with a large number of conferees employing a reduced amount of hardware and having improved speech quality as compared to the above-mentioned digital-to-analog and analog-to-digital conversion type conference bridge.

Still another object of the present invention is to provide a digital conference bridge for a delta modulated switching system overcoming the above-mentioned disadvantages.

A feature of the present invention is the provision of a digital conference bridge for a delta modulated switching system having information transmitted by delta modulated bits in M channels of a time division multiplex frame, when M is an integer greater than three, comprising: N conferees, where N is an integer greater than two but less than M; first means to interconnect the N conferees to enable a conference to take place among the N conferees; N means of a second type coupled to the first means, each of the N means of the second type storing the three latest delta modulation bits of a different one of each of the N conferees; N means of a third type each coupled to a different one of the N means of the second type, each of the N means of the third type providing an indication when the three latest bits have identical values; fourth means coupled to each of the N means of the third type to determine from the indications a new speaker and to produce a control signal identifying the new speaker; and fifth means coupled to the first means, the N means of the second type and the fourth means responsive to the control signal to distribute the delta modulation bits of the new speaker to all of the N conferees.

BRIEF DESCRIPTION OF THE DRAWING

Above-mentioned and other features and objects of this invention will become more apparent by reference to the following description taken in conjunction with the accompanying drawing, in which:

FIG. 4 is a block diagram of the digital speech detector of one conference channel in the conference bridge of FIG. 1 to indicate the presence of speech in this one channel and also modified to show the common count comparator that would be employed to determine the largest count and hence a new speaker when ten such digital speech detectors are employed for the ten conference channels of FIG. 1.

DESCRIPTION OF THE PREFERRED EMBODIMENT

Figure 1:
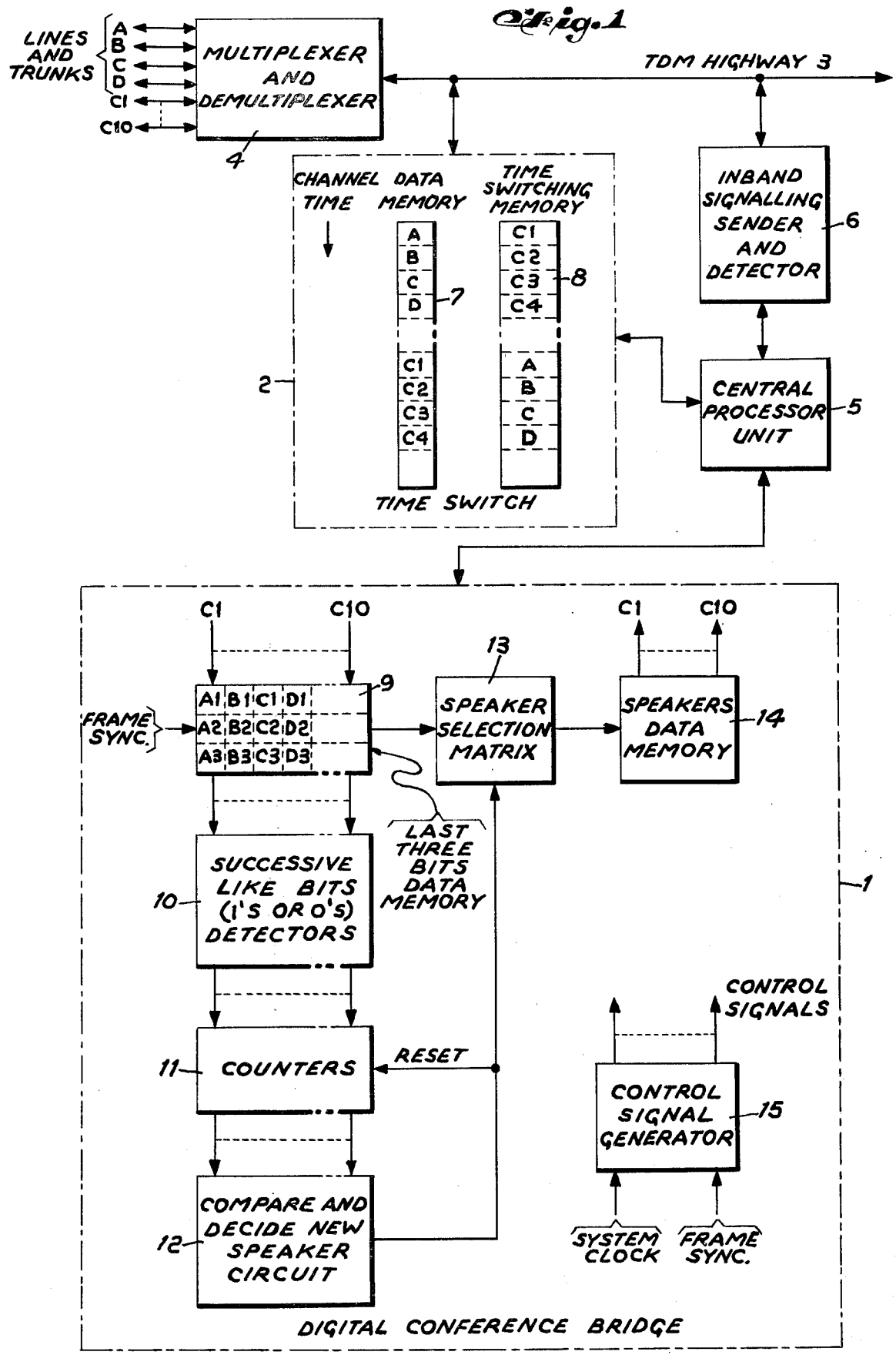
FIG. 1 is a block diagram of a digital conference bridge in accordance with the principles of the present invention for use in a delta modulated switching system.

Referring to FIG. 1 there is illustrated therein a digital conference bridge 1 coupled to a delta modulated time switch 2 which is coupled to TDM (time division multiplex) highway 3 including in a TDM frame thereon, for purposes of illustration, 72 channels of information (M = 72). The delta modulation bits have, for purpose of illustration, a rate of 32 Kbs (kilobits per second) for each channel on highway 3. Highway 3 is coupled to multiplexer and demultiplexer 4 for communication with subscribers or conferees A, B, C and D and bridge terminals C1 to C10. The switch 2 and bridge 1 are under control of a central processor unit 5 coupled to highway 3 by means of an inband signalling sender and detector 6. For purposes of illustration, there are ten conferees (N = 10) and are connected to terminals C1 to C10.

Time switch 2 includes a data memory 7 and a time switching memory 8, both of which include 72 storage cells or areas to be compatible with the number of channels in the TDM frame on highway 3.

Conference bridge 1 includes a last three bits data memory 9 including a three bit storage circuit for each conference channel in bridge 1 for storing the last three bits of the associated conferees. The information in memory 9 for each of the conferees C1 to C10 are processed during the conference for identifying the active speakers at any instant. This processing is done by the successive like bit detectors 10, counters 11 and the compare and decide new speaker circuit 12. Each storage stage of memoory 9 stores one bit for its associated party in the conference. Successive bits of each confeee are advanced to the next order storage stage at the end of each TDM frame. That is, the contents of the second storage stage is shifted into the third storage stage, the contents of the first storage stage is shifted into the second storage stage and the new bit is shifted into the first storage stage of memory 9. This occurs for each of the conferees. There is one detector 10 provided for each party in the conference and is associated with the storage stages of that party in memory 9. The function of each of the detectors 10 is to detect three successive binary 1's or three successive 0's which characterize the activity of the party involved. Whenever three successive like bits are detected, the associated one of counters 11 has its count increased.

Each of counters 11 is associated with a different one of conferee to count the total number of three successive like bits detected by detectors 10 and counted during the observation period. All of counters 11 are reset whenever a new speaker is detected.

Circuit 12 is common to each of the conferee channels and the contents of all of the counters 11 are checked and compared periodically, 8 ms (milliseconds) typically, to monitor the activity of every party and to decide if a new speaker appears in the conference. Circuit 12 makes this decision as to the presence of a new speaker by detecting the largest count contained in one of the counters 11. Upon detection of a new speaker, circuit 12 generates a control signal which is used to reset counters 11 and also to control speaker selection matrix 13.

Speaker selection matrix 13 selects the new speakers data under control of the control signal from circuit 12 from one of the stages storing the new speakers data of the data memory 9 and sends it to speakers data memory 14. The connection established by matrix 13 under control of the control signal 12 is held until the speaker changes.

Speaker data memory 14 is a single bit memory, such as a single flip-flop stage, which stores the speech samples of the present speaker among the conferees. The memory is updated in accordance with the delta data bits received from the new speaker at a 32 Kbs rate which is the rate of the data bits for each channel on highway 3. The data stored in memory 14 is sent to all conferees via the transmitting paths of the terminals of bridge 1 through time switch 2.

Control signal generator 15 generates the necessary channel timing and other control signals to time the operation of bridge 1. All of the control signals will be derived from the system clock or use those available in the system such as the frame sync signal. Generator 15 also cooperates with detector 6 in order to communicate with unit 5 for supervision and signalling.

In order to provide a comprehensive description of the operation of bridge 1, a typical conference will be established as an illustration in cooperation with time switch 2.

Bridge 1 is assumed to have a maximum capacity of a ten party conference and subscriber A is requesting a conference with subscribers B, C and D. The terminals of bridge 1 are arbitrarily connected to the TDM channels of highway 3 for this illustration, but they can be either distributed throughout the TDM frame or concentrated in a certain portion of the TDM frame to suit the application environment.

The status change (off-hook) and the signalling (keying conference, party numbers - B, C, and D, etc.) of subscriber A are reported to unit 5 via detector 6 as a normal routine in processing a call origination. Then, unit 5 will request an idle digital conference bridge for establishing the conference.

Depending on the procedural requirements, all parties may be notified individually either by the conference originating party A or operator before connecting all parties with the conference bridge 1.

When all parties are ready for conference, unit 5 makes four connections between the parties and the bridge terminals, A-C1, B-C2, C-C3, and D-C4. These connections are established as if four separate connections were being set up in normal connecting routine.

The information required for making these connections is established by unit 5 and is written into memory 8.

When channel A's time-slot arrives, the following events occur: (1) The speech of party A is sampled and the sample A is written into the corresponding channel address A of data memory 7. (2) At the same time, the content of C1 of memory 8 in the channel address is read out to unit 5. (3) C1 is decoded in unit 5 for reading out the present speaker's speech sample from C1 of memory 7 and sending it to party A via highway 3 through multiplexer and demultiplexer 4. This establishes one direction of conversation, that is, party A has heard what the present speaker said.

When channel B's or C's or D's time-slot is reached successively, the above events are repeated except A is replaced by B, or C, or D and C1 by C2 or C3 or C4, respectively, in the above explanation.

When channel C1's time-slot arrives, the following events occur: (1) A new speaker's speech sample or delta bit is read out of memory 14 and replaces the previous speaker's sample or delta bit in memory 7 at the corresponding address C1. (2) At the same time, the content A of memory 8 in the channel address is read out to unit 5. (3) After decoding A in unit 5, the information is utilized to address A's channel word of memory 7 for reading out party A's speech sample or delta bit A and is sent to the conference bridge and is written into the first stage of memory 9 of bridge 1. Thus, the other direction of conversation is established. That is, the speaker has heard what party A sent via digital conference bridge 1.

Similarly conversations between the speaker and other parties B, C, and D will be furnished successively.

In addition to establishing connections among conferees, bridge 1 must provide the capability of detecting speaker changes during the conference. The theoretical analysis and detailed description of such speaker detection will be set further hereinbelow in connection with FIGS. 2, 3 and 4. However, a brief explanation is presented here.

Whenever a party's sample or delta bit is written in the first word of memory 9, the associated like bit detector 10 is activated. Upon detecting either three successive 1's or 0's the associated one of counters 11 has its count increased. In order to update speech samples (delta modulation bits) every frame, the data memory words are advanced by the frame sync signal. That is, to shift out the contents of the third stage and replace them by the contents of the second stage, transfer the contents of the first stage to the second stage and to empty the first stage for accepting a new sample (delta bit) during the frame.

The cumulative counts of all counters 11 are periodically, 8 ms typically, checked and compared to decide if the speaker of the conference has changed. The comparison is based upon which of the counters 11 provides the largest count which is an indication that there is a new speaker. The precise checking time period and threshold count will be set forth hereinbelow with respect to FIG. 4.

Upon the detection of speaker change, all counters are reset and the new speaker's data storage stage of memory 9 is connected to memory 14 via selection matrix 13. Thus, the new speaker samples or delta bits can be transmitted to all parties in the conference by switch 2.

The process is repeated until another change of speaker is found. The conference proceeds by the aid of bridge 1 and time switch 2.

At the end of a conference, a line status change or supervisory signals are detected by detector 6 and are reported to unit 5. In turn, unit 5 issues a command to erase the connecting information from memory 8. Thus, all parties are disconnected, and also bridge 1 and time switch 2 are idled, ready for other subscriber's connections.

Figure 2:
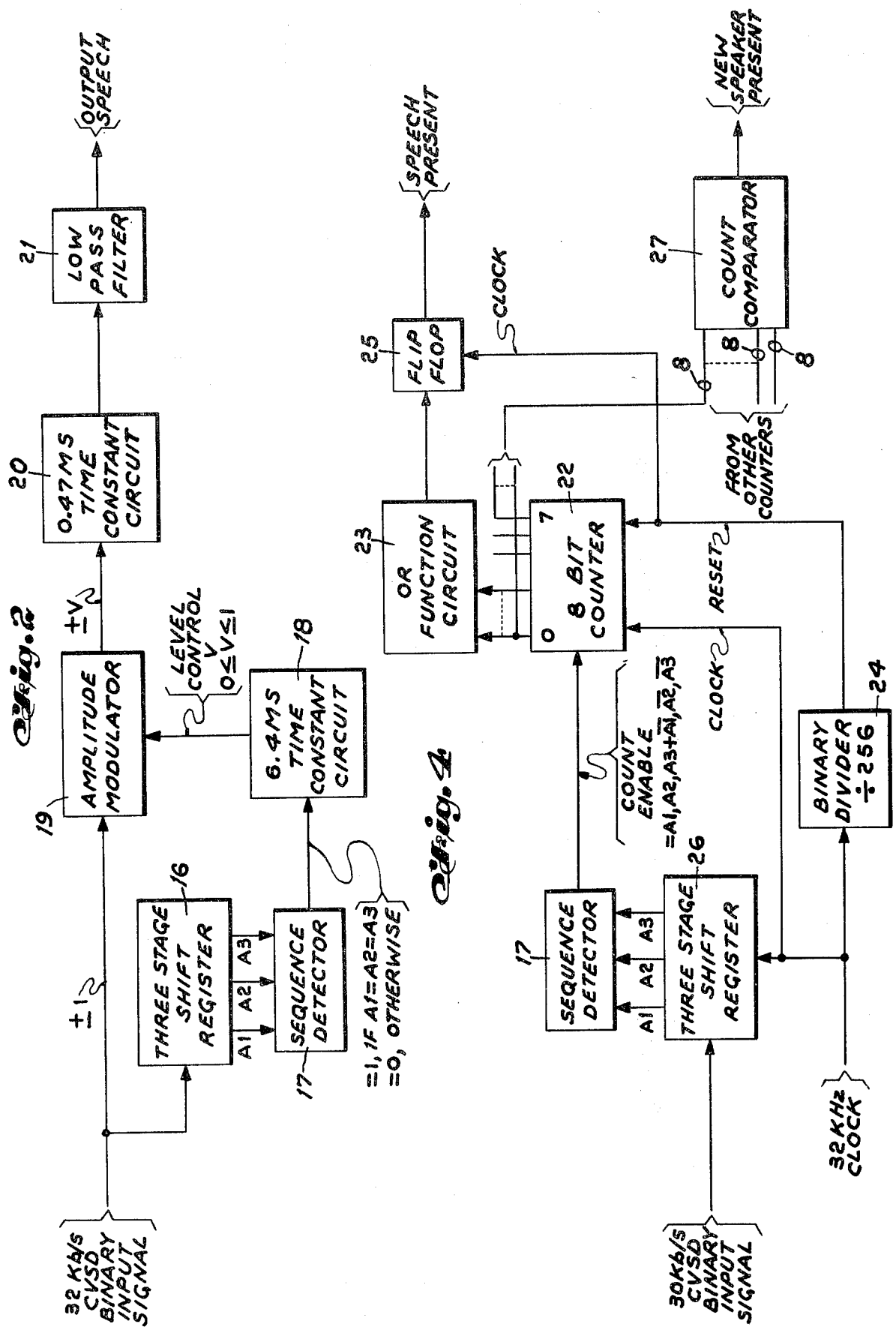
FIG. 2 is a block diagram of a continuous variable slope delta (CVSD) demodulator to assist in the understanding of the development and operation of the components of the digital speech detector of FIG. 4 provided in one conference channel of FIG. 1.

Referring to FIG. 2, there is illustrated therein a block diagram of a CVSD demodulator operating at 32 Kbs for the purpose of providing a theoretical analysis and demonstrating the development and operation of the digital speech detector of FIG. 4. The received binary signal is assumed to be represented by ± 1 volt. The three stage shift register 16 stores three successive input bits A1, A2 and A3. These successive bits are compared in sequence detector 17 which provides an output pulse at + 1 volt if the three input bits have the same sign, otherwise, detector 17 provides a 0 volt output. The output of sequence detector 17 is averaged by an RC (resistor-capacitor) time constant circuit 18 having a time constant of 6.4 ms which results in a slowly varying DC (direct current) level control voltage V.

Figure 3:
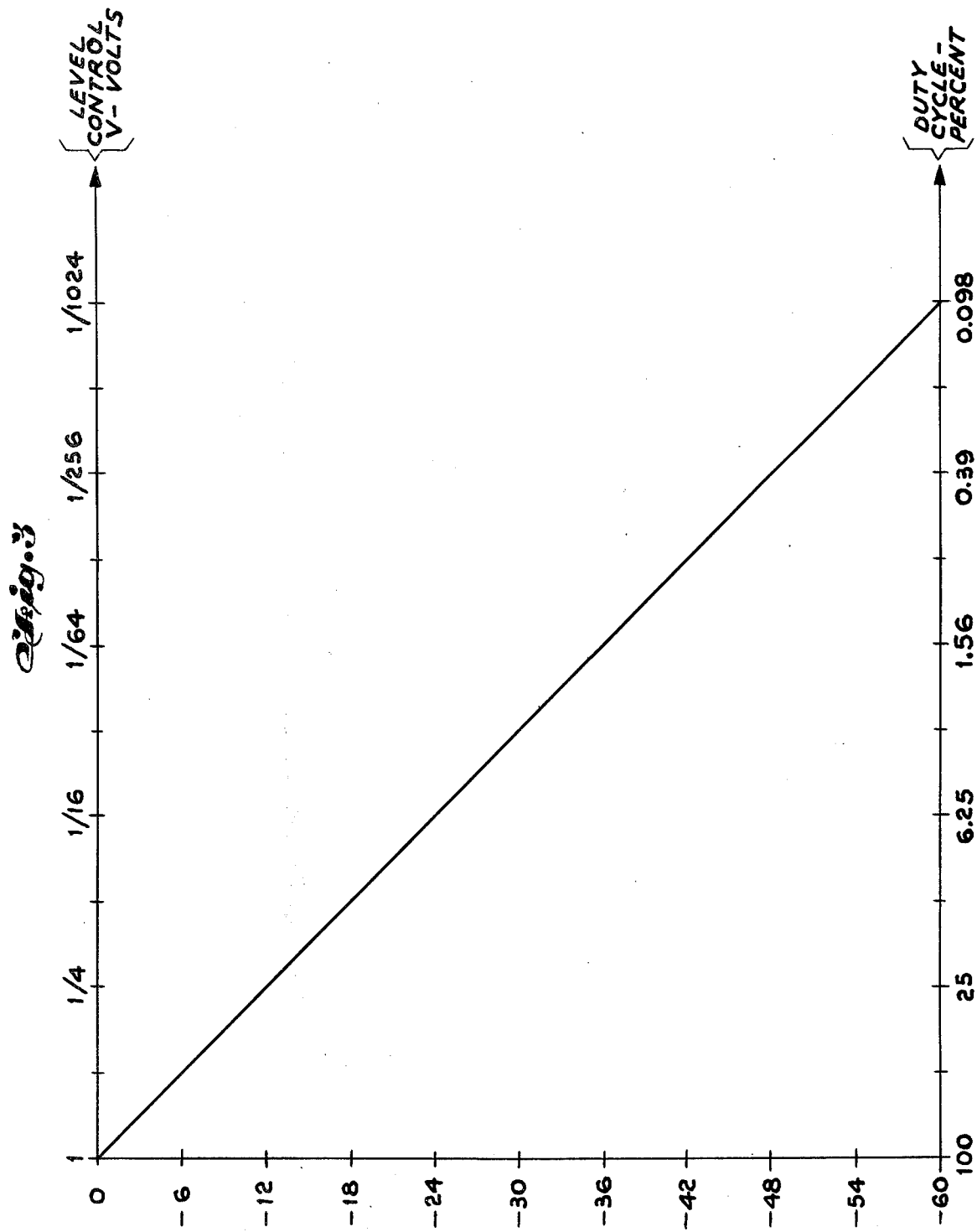
FIG. 3 is a curve illustrating the signal level as a function of control voltage of the demodulator of FIG. 2.

This control voltage V modulates the amplitude of the input delta modulation binary signal or bits in amplitude modulator 19. The amplitude modulated output bits are passed through time constant circuit 20 and low pass filter 21, the output of which is the analog speech. Thus, control voltage V is a direct measure of the speech level. FIG. 3 shows this relationship. A control voltage of + 1 volt results in a full load signal amplitude which is taken as 0 db (decibel). This is approached if the original input is a very strong low frequency signal. Such an input causes the output signal of sequence detector 17 to be almost a 100 percent duty cycle, which is indicated in FIG. 3.

A 50 percent duty cycle from detector 17 provides a 0.5 volt control voltage and an output signal amplitude of ½ the full load signal, i.e., − 6 db. Other duty cycles corresponding to the indicated signal levels are shown in FIG. 3. A zero control voltage corresponding to a zero amplitude signal is possible if the transmitting CVSD modulator is perfectly balanced and the input handset produces no background noise. In practice, such a balance is not maintained and a duty cycle of a fraction of a percent to a few percent results. This, in turn, produces an idle channel noise, perhaps as high as −30 db.

There is another factor which prevents operation of the CVSD demodulator at very low levels, say below about −40 db. This is the limited averaging time used in circuit 18 to produce control voltage V. At 32 Kbs there are approximately 200 bits in the 6.4 ms syllabic time constant averaging period. If sequence detector 17 produces just one pulse during this time, the duty cycle would be 0.5 percent (−46 db). For duty cycles below this, the control voltage V will fluctuate up and down following the individual pulses from sequence detector 17.

There is not enough data available on the long term idle channel noise for production quantities of CVSD demodulators and modulators to be more specific than this. However, it seems fair to say that a speech detector threshold for CVSD modulation will have to be higher than that used in analog or PCM (pulse code modulation) systems where thresholds of −40 db are typically used. This is because idle channel noise for a CVSD system will probably run at least this high.

On the other hand, it is important to keep the threshold as low as possible to minimize clipping of low level onsets of the speaker. This would indicate that the threshold should be below at least −30 db. Thus, for purposes of designing the speech detector, it will be assumed that the threshold will be set for the range of 1 to 5 percent (−40 db to −26 db).

An analog speech detector for CVSD modulation would operate by means of a threshold detector operating on the control voltage V. An alternative is a digital circuit which performs the same function as the sequence detector, syllabic time constant and threshold detector. A digital equivalent to an RC time constant exists but for the required time constant the digital circuit would use many more bits than necessary for a digital speech detector.

FIG. 4 illustrates in block diagram form a digital speech detector in accordance with the principles of this invention which uses a counter instead of a digital equivalent of the RC time constant. The circuit shown in FIG. 4 is all the circuitry that is required for one conference channel in bridge 1 up to but not including circuit 12 and would be repeated ten times for the ten conference channels in bridge 1. Counter 22 counts the number of 1's at the output of sequence detector 17 which is equivalent to one of the detectors of detectors 10, while counter 22 is equivalent to one of the counters of counters 11. Counter 22 operates on the output of detector 17 over an 8 ms interval. The following table indicates thresholds which can be conveniently detected by means of an OR function circuit 23 monitoring the most significant bits of counter 22. To avoid overflow, the maximum count of counter 22 is set to 255, the 256-th time as provided by the binary divider 24 is used to reset counter 22 and as a clock for flip-flop 25 providing a pulse output indicating the presence of speech.

| Threshold | Table of Convenient Thresholds | | |
|---|---|---|---|
| | Duty Cycle | Count Threshold | Or Gate Bits |
| −24 db | 6.25% | 16 | 0 − 3 |
| −30 db | 3.125% | 8 | 0 − 4 |
| −36 db | 1.56% | 4 | 0 − 5 |
| −42 db | 0.78% | 2 | 0 − 6 |

The three stage shift register 26 receiving the binary input signal has its three stages coupled to sequence detector 17 and is shifted under control of a 32 KHz (kilohertz) clock. Shift register 26 corresponds to the three stages of data memory 9 for each of the conference channels. Sequence detector 17 may include an AND-gate coupled to the three 1's output of the flip-flop stages of shift register 26 and a second AND-gate connected to the 0's output of the flip-flop stages of shift register 26 with an OR-gate being coupled to the output of these two AND-gates so that a count enable for counter 22 is provided when bits A1, A2 and A3 are all 1 and A1, A2 and A3 are all 0.

As previously mentioned, the circuitry of FIG. 4 from shift register 26 to flip-flop 25 provide a digital speech detector for one delta modulated input signal. When ten such circuit arrangements are provided for the ten conference channels of bridge 1, a count comparator 27, which is an implementation of circuit 12, is coupled to receive the count of counter 22 of each of the conference channels so that comparator 27 may determine which of the counters of the conference channels is the highest and then produce a properly timed pulse output identifying the new speaker (the speaker having the largest count) so as to properly activate selection matrix 13 so that the new speakers delta bits are distributed to all the other conferees through memory 14 and time switch 2.

For digital conferencing, FIG. 4 could be modified as follows. Counter 22 and circuit 23 can be time-shared with the counter contents being stored in a serial or a random access memory. In addition, a second detection criteria can be added. This consists of comparing the final counts for each channel to determine the largest. If the largest is greater than the threshold, this channel is assigned to the output; otherwise the assignment is left unchanged. This permits one talker to interrupt another but prevents unnecessary reassignment (and therefore unnecessary first syllable speech clipping), when a single talker pauses, just because another channel has a greater idle channel noise.

Conference bridge 1 has the following advantages: (1) Provides conferences without digital-to-analog conversion, thus retaining the quality of transmission. (2) Detects a new speaker in the conference instantaneously without clipping the new speaker's first syllable of the speech. (3) Works with time switches without any modification thereto. (4) Uses a time switch as the sole switching matrix for a small system. (5) Adds no extra load to the central processor because the bridge itself is self-contained. (6) Allows an arbitrary number of parties in a conference.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital conference bridge for a delta modulated switching system having information transmitted by delta modulated bits in M channels of a time division multiplex frame, where M is an integer greater than three, comprising:
   N conferees, where N is an integer greater than two but less than M;
   first means to interconnect said N conferees to enable a conference to take place among said N conferees;
   N means of a second type coupled to said first means, each of said N means of said second type storing the three latest delta modulation bits of a different one of each of said N conferees;
   N means of a third type each coupled to a different one of said N means of said second type, each of said N means of said third type providing an indication when said three latest bits have identical values;
   fourth means coupled to each of said N means of said third type to determine from said indications a new speaker and to produce a control signal identifying said new speaker; and
   fifth means coupled to said first means, said N means of said second type and said fourth means responsive to said control signal to distribute said delta modulation bits of said new speaker to all of said N conferees.

2. A conference bridge according to claim 1, wherein each of said N means of said second type includes a three stage shift register.

3. A conference bridge according to claim 2, wherein each of said N means of said third type includes
   a sequence detector coupled to an associated one of said shift registers providing a binary 1 output when said three latest bits are all binary 1 and a binary 1 output when said three latest bits are all binary 0, and
   a counter coupled to said sequence detector whose count is increased each time a binary 1 output is provided by said sequence detector and to provide said indication in the form of a count of said counter.

4. A conference bridge according to claim 3, wherein said fourth means is coupled in common to each of said counters to compare said count of each of said counters and to produce said control signal for that one of each of said counters having a largest count, said largest count indicating said new speaker.

5. A conference bridge according to claim 4, wherein said fifth means includes
   a selection matrix coupled to each of said shift registers and said fourth means responsive to said control signal to select said delta modulation bits of said new speaker, and
   a one bit memory coupled to said selection matrix and said first means to distribute said delta modulation bits of said new speaker to all of said conferees.

6. A conference bridge according to claim 1, wherein each of said N means of said third type includes
   a sequence detector coupled to an associated one of said N means of said second type providing a binary 1 output when said three latest bits are all binary 1 and a binary 1 output when said three latest bits are all binary 0, and
   a counter coupled to said sequence detector whose count is increased each time a binary 1 output is provided by said sequence detector and to provide said indication in the form of a count of said counter.

7. A conference bridge according to claim 6, wherein said fourth means is coupled in common to each of said counters to compare said count of each of said counters and to produce said control signal for that one of each of said counters having a largest count, said largest count indicating said new speaker.

8. A conference bridge according to claim 7, wherein said fifth means includes
   a selection matrix coupled to each of said N means of said second type and said fourth means responsive to said control signal to select said delta modulation bits of said new speaker, and
   a one bit memory coupled to said selection matrix and said first means to distribute said delta modulation bits of said new speaker to all of said conferees.

9. A conference bridge according to claim 1, wherein said fifth means includes a selection matrix coupled to each of said N means of said second type and said fourth means responsive to said control signal to select said delta modulation bits of said new speaker, and a one bit memory coupled to said selection matrix and said first means to distribute said delta modulation bits of said new speaker to all of said conferees.

* * * * *